United States Patent
Burdette et al.

(10) Patent No.: US 11,242,762 B2
(45) Date of Patent: Feb. 8, 2022

(54) VANE WITH COLLAR

(71) Applicant: UNITED TECHNOLOGIES CORPORATION, Farmington, CT (US)

(72) Inventors: Alyson T. Burdette, Glastonbury, CT (US); Bryan P. Dube, Columbia, CT (US); Rutva A. Patel, Middletown, CT (US); Nicholas Broulidakis, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 81 days.

(21) Appl. No.: 16/690,989

(22) Filed: Nov. 21, 2019

(65) Prior Publication Data

US 2021/0156271 A1    May 27, 2021

(51) Int. Cl.
*F01D 9/04* (2006.01)
*F01D 5/14* (2006.01)
*B28B 11/00* (2006.01)

(52) U.S. Cl.
CPC ............... *F01D 9/041* (2013.01); *F01D 5/14* (2013.01); *F01D 5/147* (2013.01); *B28B 11/006* (2013.01); *F05D 2240/12* (2013.01); *F05D 2240/80* (2013.01); *F05D 2300/6033* (2013.01)

(58) Field of Classification Search
CPC . F01D 9/041; F01D 5/147; F01D 5/14; B28B 11/006; F05D 2240/80; F05D 2240/12; F05D 2300/6033
See application file for complete search history.

(56) References Cited

U.S. PATENT DOCUMENTS

| | | | | |
|---|---|---|---|---|
| 730,363 A | * | 6/1903 | Geisenhoner | F01D 5/225 416/191 |
| 1,547,838 A | * | 7/1925 | Steenstrup | B22D 19/00 415/209.4 |
| 2,110,679 A | * | 3/1938 | Robinson | F01D 5/141 416/189 |
| 2,925,998 A | * | 2/1960 | Hayes | F01D 9/042 415/137 |
| 4,464,094 A | * | 8/1984 | Gerken | B23P 15/006 164/122 |

(Continued)

FOREIGN PATENT DOCUMENTS

EP    3650653    5/2020

OTHER PUBLICATIONS

Monolithic Ceramics—A Global Market Overview—Website Description Only—3 Pages—Published Apr. 2017 (Year: 2017).*

(Continued)

*Primary Examiner* — Woody A Lee, Jr.
*Assistant Examiner* — Brian Christopher Delrue
(74) *Attorney, Agent, or Firm* — Carlson, Gaskey & Olds, P.C.

(57) ABSTRACT

An airfoil piece includes a first vane platform, a second vane platform, and a hollow airfoil section that joins the first vane platform and the second vane platform. The hollow airfoil section includes a collar projection which extends past the first vane platform. The collar projection includes at least one radial tab projecting therefrom. An airfoil assembly and a method of assembling a vane are also disclosed.

19 Claims, 4 Drawing Sheets

(56) References Cited

U.S. PATENT DOCUMENTS

| | | | | |
|---|---|---|---|---|
| 5,332,360 A * | 7/1994 | Correia | F01D 9/042 | 29/889.21 |
| 6,000,906 A * | 12/1999 | Draskovich | F01D 17/162 | 415/209.4 |
| 6,164,903 A * | 12/2000 | Kouris | F01D 9/04 | 415/135 |
| 6,200,092 B1 * | 3/2001 | Koschier | F01D 5/146 | 415/191 |
| 6,884,030 B2 * | 4/2005 | Darkins, Jr. | F01D 9/042 | 29/889.22 |
| 7,114,917 B2 * | 10/2006 | Legg | F01D 9/04 | 415/137 |
| 7,452,182 B2 * | 11/2008 | Vance | F01D 5/14 | 415/135 |
| 8,206,096 B2 * | 6/2012 | Prentice | F01D 5/282 | 415/191 |
| 8,226,361 B2 * | 7/2012 | Prentice | F01D 25/246 | 415/191 |
| 8,251,652 B2 * | 8/2012 | Campbell | F01D 9/041 | 415/209.3 |
| 8,926,262 B2 * | 1/2015 | Tanahashi | F01D 11/005 | 415/9 |
| 9,803,486 B2 * | 10/2017 | Freeman | C04B 37/005 | |
| 10,072,516 B2 * | 9/2018 | Carr | F01D 25/28 | |
| 10,094,239 B2 * | 10/2018 | Freeman | F01D 9/042 | |
| 10,207,471 B2 * | 2/2019 | de Diego | F01D 25/005 | |
| 10,260,362 B2 * | 4/2019 | Varney | F01D 5/284 | |
| 10,309,240 B2 * | 6/2019 | Heitman | F01D 9/042 | |
| 10,329,950 B2 * | 6/2019 | Freeman | F01D 9/041 | |
| 10,480,329 B2 * | 11/2019 | Spangler | F01D 9/041 | |
| 10,655,482 B2 * | 5/2020 | Freeman | F01D 9/044 | |
| 10,662,792 B2 * | 5/2020 | Harris | F01D 9/041 | |
| 10,767,497 B2 * | 9/2020 | Vetters | F01D 9/042 | |
| 10,851,676 B2 * | 12/2020 | Ikeguchi | F01D 25/30 | |
| 10,934,870 B2 * | 3/2021 | Whittle | F01D 9/041 | |
| 10,961,857 B2 * | 3/2021 | Whittle | F01D 9/042 | |
| 10,975,708 B2 * | 4/2021 | Whittle | F01D 25/246 | |
| 10,975,709 B1 * | 4/2021 | Woodfield | F01D 9/042 | |
| 2004/0120811 A1 | 6/2004 | Darkins et al. | | |
| 2005/0254942 A1 * | 11/2005 | Morrison | C04B 37/005 | 415/200 |
| 2007/0140845 A1 * | 6/2007 | Marke | F01D 25/162 | 415/232 |
| 2007/0154305 A1 * | 7/2007 | Arness | F01D 9/041 | 415/209.2 |
| 2010/0162717 A1 | 7/2010 | O'Leary | | |
| 2010/0183435 A1 * | 7/2010 | Campbell | F01D 5/282 | 415/209.3 |
| 2012/0128482 A1 * | 5/2012 | Dezouche | F01D 11/001 | 415/209.2 |
| 2013/0094951 A1 * | 4/2013 | McCaffrey | F01D 25/246 | 415/200 |
| 2016/0004296 A1 | 1/2016 | Haj-Yihia et al. | | |
| 2016/0084096 A1 * | 3/2016 | Carr | F02C 3/04 | 60/805 |
| 2016/0290147 A1 * | 10/2016 | Weaver | F01D 25/005 | |

OTHER PUBLICATIONS

European Search Report for European Patent Application No. 20208852.2 dated Apr. 15, 2021.

* cited by examiner

VANE WITH COLLAR

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramic matrix composite ("CMC") materials are also being considered for airfoils. Among other properties, CMCs have high temperature resistance and oxidation resistance.

SUMMARY

An airfoil piece according to an example of this disclosure includes a first vane platform, a second vane platform, and a hollow airfoil section that joins the first vane platform and the second vane platform. The hollow airfoil section includes a collar projection which extends past the first vane platform. The collar projection includes at least one radial tab projecting therefrom.

In a further example of the foregoing, the collar projection has a first radial extent and the at least one radial tab has a second radial extent, and a ratio of the first radial extent to the second radial extent is between about 1:1 and 1:5.

In a further example of any of the foregoing, at least one radial tab comprises a plurality of radial tabs, and the plurality of radial tabs have a cumulative circumferential extent.

In a further example of any of the foregoing, the cumulative circumferential extent is between about 20 and 40% of a circumferential extent of the collar projection.

In a further example of any of the foregoing, the airfoil section and collar projection include at least one continuous ceramic matrix composite ply.

In a further example of any of the foregoing, the hollow airfoil section is configured to receive a metallic spar piece therein.

In a further example of any of the foregoing, the hollow airfoil includes first and second cavities separated by a divider, at least one radial tab is at a circumferential location of collar projection that corresponds to a location of the divider.

An airfoil assembly according to an example of this disclosure includes a vane piece which has a first vane platform, a second vane platform, and a hollow airfoil section, which joins the first vane platform and the second vane platform. The hollow airfoil section includes a collar projection which extends past the first vane platform. The collar projection includes at least one radial tab projecting therefrom. A spar piece defines a spar platform and a spar extends from the spar platform into the hollow airfoil section. The spar piece includes a radial pocket which is defined by first and second opposed faces. The radial pocket is configured to receive the collar projection.

In a further example of the foregoing, the collar projection has a first radial extent and the at least one radial tab has a second radial extent. A ratio of the first radial extent to the second radial extent is between about 1:1 and 1:5.

In a further example of any of the foregoing, at least one radial tab comprises a plurality of radial tabs, and the plurality of radial tabs have a cumulative circumferential extent.

In a further example of any of the foregoing, the cumulative circumferential extent is between about 20 and 40% of a circumferential extent of the collar projection.

In a further example of any of the foregoing, the airfoil section and collar projection include at least one continuous ceramic matrix composite ply.

In a further example of any of the foregoing, the collar projection is a radially outer collar projection.

In a further example of any of the foregoing, the spar piece is metallic and the airfoil piece is ceramic matrix composite.

In a further example of any of the foregoing, the spar piece is configured to transfer structural loads from the airfoil piece to a support structure via the collar projection.

In a further example of any of the foregoing, the radial pocket includes at least one mating feature which is configured to mate with the at least one radial tab.

A method of assembling a vane according to an example of this disclosure includes inserting a spar piece into a cavity of a hollow airfoil section of an airfoil piece. The airfoil piece has a first vane platform and a second vane platform. The hollow airfoil section joins the first vane platform and the second vane platform. The hollow airfoil section includes a collar projection which extends past the first vane platform. The collar projection includes at least one radial tab projecting therefrom.

In a further example of the foregoing, the insertion includes aligning a pocket in a spar platform of the spar piece with the collar projection.

In a further example of any of the foregoing, the pocket includes at least one mating feature which is configured to mate with the at least one radial tab.

In a further example of any of the foregoing, the spar piece is metallic and the airfoil piece is ceramic matrix composite.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
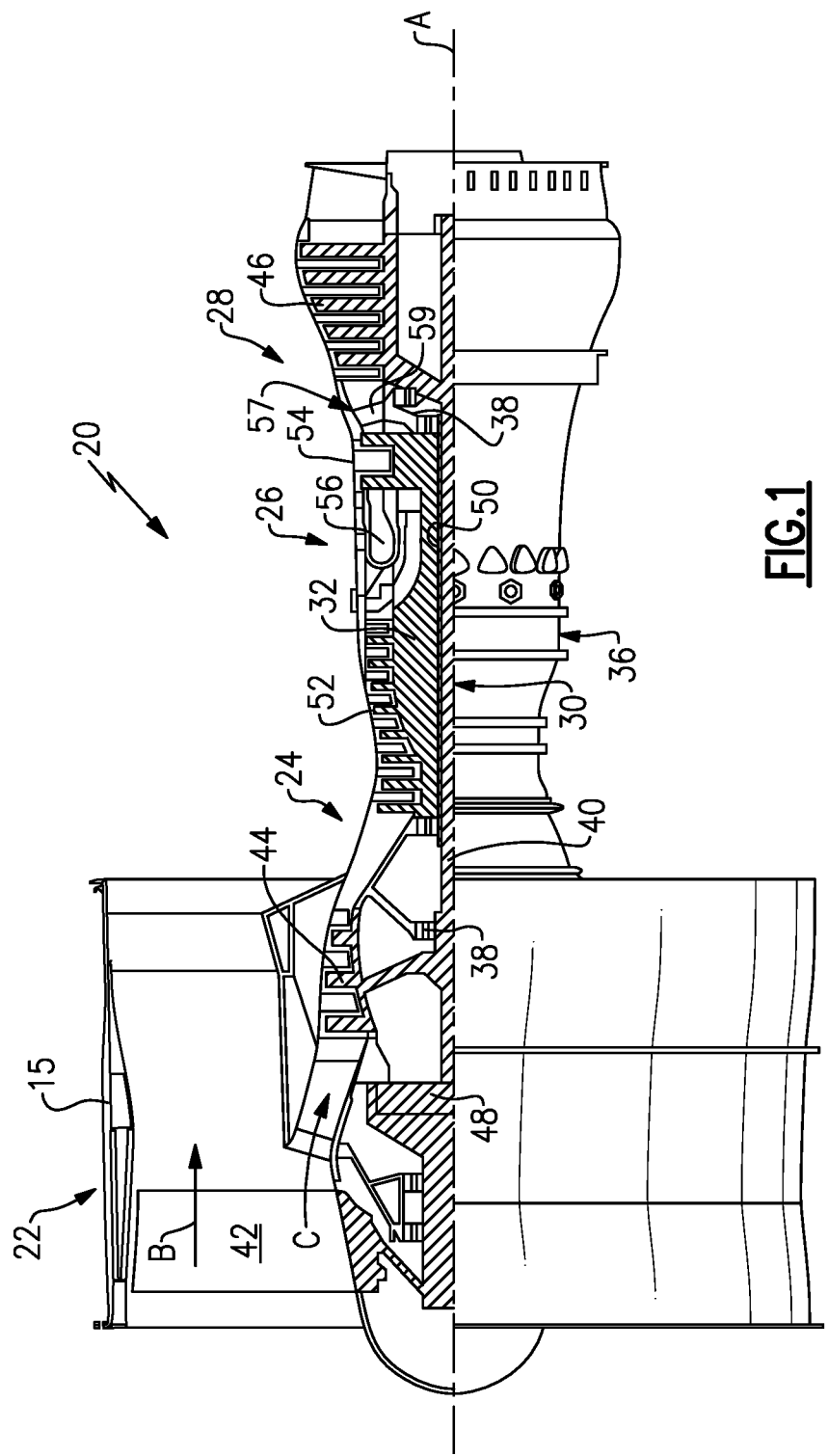
FIG. 1 schematically shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram °R)/(518.7°R)]^0.5. The "Low corrected fan tip speed" as disclosed herein according to one non-limiting embodiment is less than about 1150 ft/second (350.5 meters/second).

Figure 2:
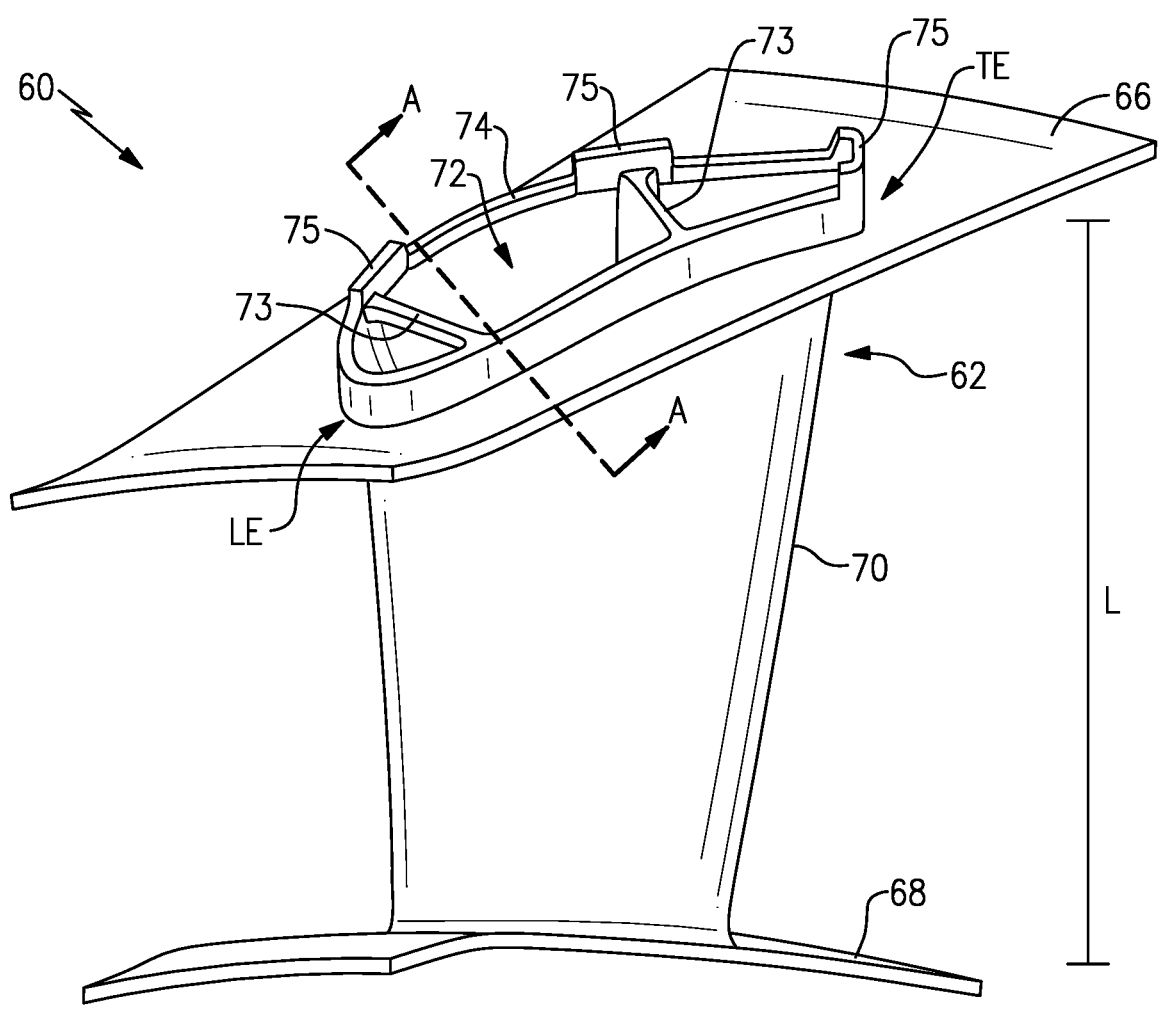
FIG. 2 schematically shows an airfoil vane assembly for the gas turbine engine of FIG. 1.
Figure 3:
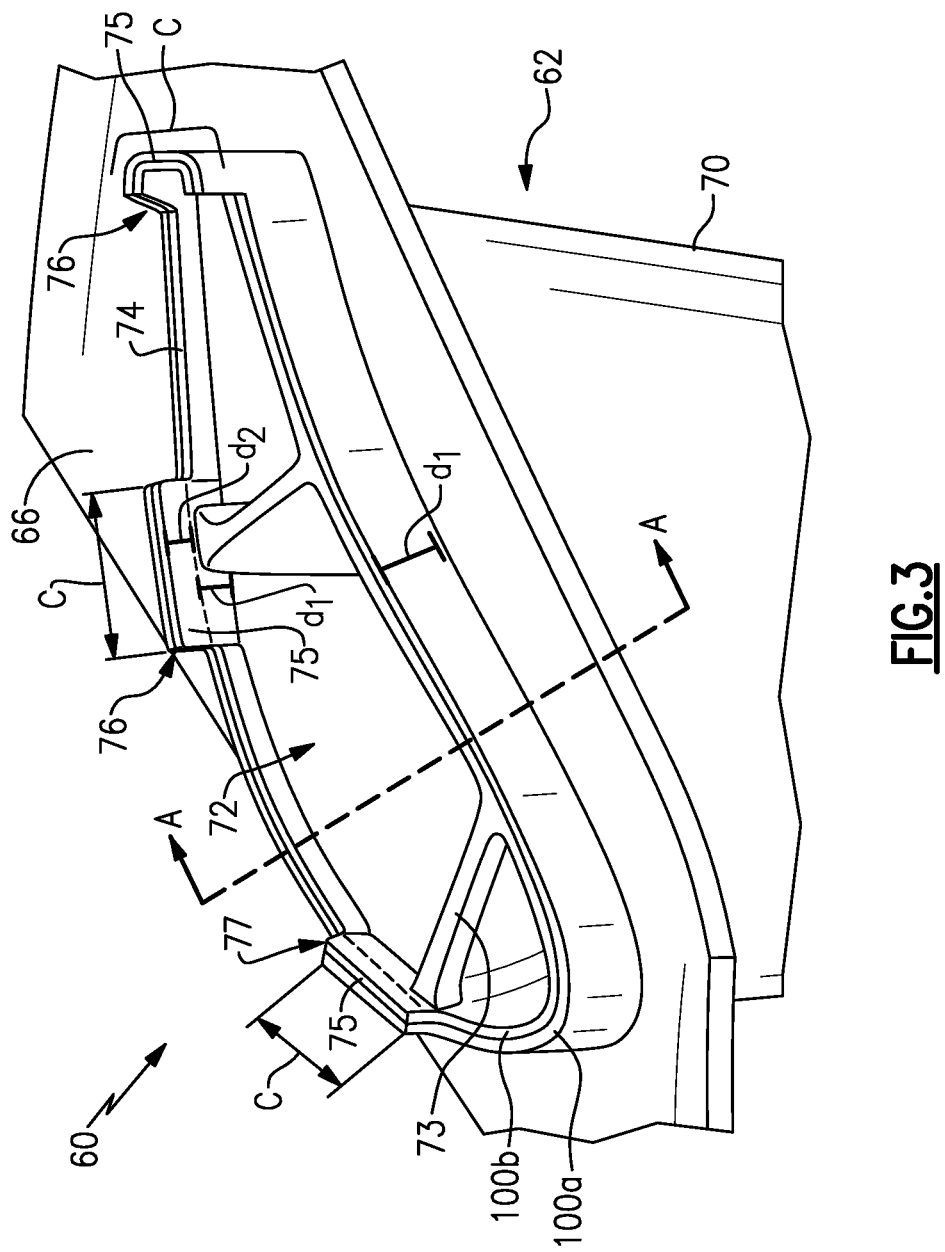
FIG. 3 schematically shows a detail view of a radially outer end of the vane airfoil assembly of FIG. 2.
Figure 4:
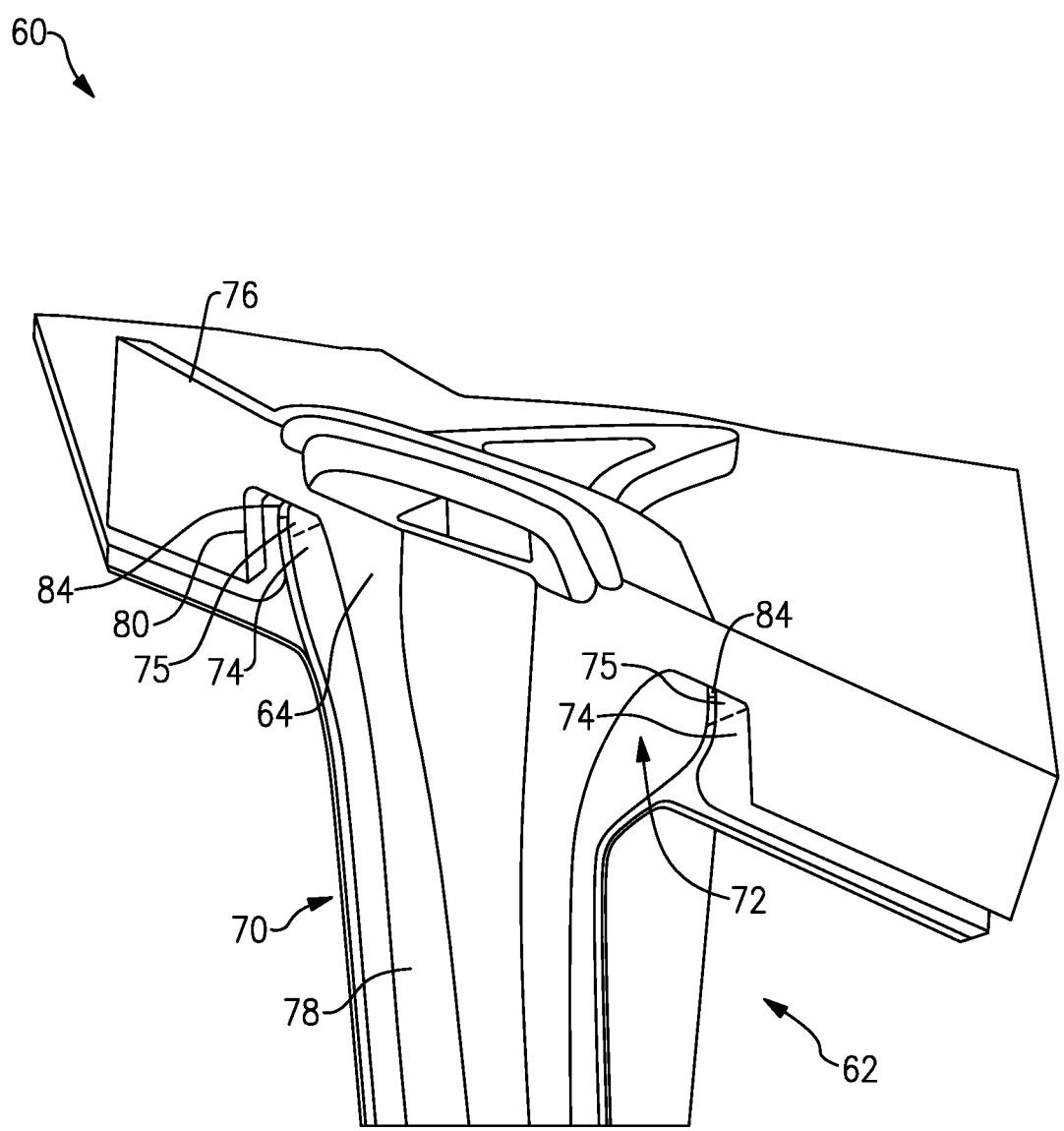
FIG. 4 schematically shows a cross-section of the airfoil vane

FIG. 2 illustrates a representative vane 60 from the turbine section 28 of the engine 20, although the examples herein may also be applied to vanes in the compressor section 24. A plurality of vanes 60 are situated in a circumferential row about the engine central axis A. FIG. 3 shows a detail view of a radially outer end of the vane 60, although it is to be appreciated that modified examples include the radially inner end. FIG. 4 shows a cross-sectional view of the radially outer end of the vane 60 taken along the section line A-A in FIG. 2.

The vane 60 is comprised of an airfoil piece 62 and a spar piece 64 (FIG. 4). The airfoil piece 62 includes several sections, including first (radially outer) and second (radially inner) platforms 66/68 and a hollow airfoil section 70 that joins the first and second platforms 66/68. The airfoil section 70 includes at least one cavity 72. In this example, there are three cavities 72 separated by dividers 73 though in other examples more or less cavities 72 could be used. The airfoil section 70 extends beyond the first platform 66 to form a collar projection 74 that projects radially from the first platform 66, i.e. the collar projection 74 is an extension of the airfoil section from the first platform 66 and thus continues the shape profile of the airfoil section. In some examples, the inner platform 68 can also include a collar projection 74. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The airfoil piece 62 may be formed of a metallic material, such as a nickel- or cobalt-based superalloy, but more typically will be formed of a ceramic. The ceramic may be a ceramic matrix composite ("CMC"). Example ceramic materials may include, but are not limited to, silicon-containing ceramics. The silicon-containing ceramic may be, but is not limited to, silicon carbide (SiC) or silicon nitride ($Si_3N_4$). An example CMC may be a SiC/SiC CMC in which SiC fibers are disposed within a SiC matrix. The CMC may be comprised of fiber plies that are arranged in a stacked configuration and formed to the desired geometry of the airfoil piece 62. For instance, the fiber plies may be layers or tapes that are laid-up one on top of the other to form the stacked configuration. The fiber plies may be woven, unidirectional, knitted, or braided, for example. In one example, at least a portion of the fiber plies may be continuous through the first platform 66, the airfoil section 70, and the second platform 68. In this regard, the airfoil piece 62 may be continuous in that at least some of the fiber plies are uninterrupted through the first platform 66, the airfoil section 70, and the second platform 68, as discussed in more detail below. In alternate examples, the airfoil piece 62 may be discontinuous such that the first platform 66, the airfoil section 70, and/or the second platform 68 are individual sub-pieces that are attached to the other sections of the airfoil piece 62 in a joint.

The spar piece 64 defines a spar platform 76 and a (hollow) spar 78 that extends from the spar platform 76 into the hollow airfoil section 70. For example, the spar piece 64 is formed of a metallic material, such as a nickel- or cobalt-based superalloy, and is a single, monolithic piece. The spar piece 64 includes a radial pocket 80 which receives the collar projection 74. The spar piece 64 connects to a support structure in the engine 20 (not shown). The spar piece 64 bears structural loads from the airfoil piece 62 during operation of the engine 20. In particular, the airfoil piece 62 transfers loads directly to the spar piece 64 via the interaction between collar projection 74 and the pocket 80 in the spar platform 76. The platform 66/68 and collar projection 74 also act as a heat shield for the spar platform 76.

As best shown in FIG. 3, the collar projection 74 has a radial extent d1 defined from the platform 66. In a particular example, the radial extent d1 of the collar projection 74 is between about 2 and 10% of the radial length L of the airfoil piece 62 (shown in FIG. 2 as the length between platforms 66/68).

The vane 60 also includes one or more radial tabs 75 extending from the collar projection 74. Though in the example shown there are three radial tabs 75, more or less radial tabs could be used. Each of the tabs 75 has a radial extent d2. The tabs 75 are generally rectangular in shape, and in one example, have rounded outer corners 77.

The tabs 75 provide additional mass/surface area for load transfer to the spar piece 64 as discussed above. The tabs 75 can be located anywhere around the circumference of the airfoil section 70. In one example, the tabs 75 are disposed near areas of the airfoil section 70 that experience the highest loads. In a particular example, at least one tab 75 is at a circumferential location of the collar projection that corresponds to the location of the divider 73. In another particular example, at least one tab 75 is located near the trailing edge TE of the airfoil section 70.

The vane 60 experiences high heat during operation of the engine 20. The high heat causes thermal expansion of the airfoil piece 62 and the spar piece 64. Because the airfoil piece 62 is a CMC material and the spar 64 is metallic, the airfoil piece 62 and spar piece 64 thermally expand and contract at different rates. Also, the spar piece 64 and/or airfoil section 70 receive cooling air in the hollow spar 78 such as bleed air from the compressor section 24 (FIG. 1). The airfoil piece 62, which comprises a CMC material, is prone to relatively higher temperature gradients along its length as compared to the spar piece 64. Accordingly, despite the cooling scheme, there may be a temperature mismatch between the airfoil piece 62 and the spar piece 64, which leads to the tendency of heat conduction between the airfoil piece 62 and the spar piece 64. The heat conduction contributes to the thermal gradient and tends to increase the gradient. The temperature mismatch is greatest at the radially inner and outer ends of the airfoil piece 62, which receives relatively less cooling air as compared to the airfoil section 70. The tabs 75 provide a surface area for load transfer to the spar piece 64 as discussed above, but overall minimize the surface area in the radial and circumferential dimensions (e.g., the product of the radial extent d2 and circumferential extent c discussed below) near the radially inner/outer ends of the airfoil piece 62 for heat conduction. Therefore, due to the tabs 75, the temperature gradient is overall urged downwards.

As shown in FIGS. 2-3, the radial tabs 75 have a radial extent d2. In some examples, the radial extent d2 is less than the radial extent d1 of the collar projection 74. In a particular example, the ratio of the radial extents d1:d2 is between about 1:1 and 1:5. Each of the radial tabs 75 also has a circumferential extent c. A cumulative circumferential extent is defined as the sum of the circumferential extent c of each of the tabs 75. In some examples, the cumulative circumferential percent of the radial tabs 75 is between about 20 and 40% of the circumferential extent of the collar projection 74. The radial tabs 75 also have a surface area which is the product of the radial extent d2 and the circumferential extent c. A cumulative surface area is defined as the sum of the surface area of each of the tabs 75.

As discussed above, the airfoil piece 62 is formed of CMC plies 100a/100b (FIG. 3). Though two plies are schematically shown, more plies could be used. For example, additional plies could be used as an outer wrap around the plies 100a/100b, and/or additional plies could be used to define the cavities 72. The CMC plies 100a/100b are continuous through the airfoil section 70 and the collar projection 74. The continuous plies 100a/100b improve the strength of the airfoil section 70 and collar projection 74. In turn, the airfoil piece 62 withstands and transfers loads directly to the spar piece 64 as discussed above. The plies can be layed up, consolidated, and cured as would generally be known in the art. In one example, the tabs 75 are machined into the collar projection 74 after formation of the airfoil piece 62 by any known method. In this example, the collar projection 74 is manufactured to a radial extent equal to the sum of the radial extents d1 and d2 (FIG. 3). In some examples, the collar projection 74 is manufactured with a manufacturing excess. Manufacturing excess is excess material that is then machined down after the airfoil piece 62 is formed to provide a desired size and geometry for the airfoil piece, as would be known in the art. Then, the manufacturing excess is removed by machining to form the tabs 75.

In one example, the collar projection 74 and tabs 75 fill substantially all of the radial extent of the pocket 80 in the spar platform 76. In one example, the pocket 80 in the spar platform 76 includes mating features 84 which mate with the tabs 75. The mating features 84 locate the tabs 75 and collar projection 74 with respect to the pocket 80. The mating features 84 also are configured to support the tabs 75 within the pocket 80.

The vane 60 is assembled by inserting the spar piece 64 into the airfoil piece 62. The assembly includes aligning the pocket 80 with the collar projection 74 (and optionally the mating features 84 with the tabs 75) such that the collar projection 74 extends into the pocket 80 when the vanes 60 are assembled.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An airfoil piece, comprising:
a first vane platform;
a second vane platform; and
a hollow airfoil section joining the first vane platform and the second vane platform, the hollow airfoil section including a collar projection extending past the first vane platform, the collar projection including at least one radial tab projecting therefrom, wherein the hollow airfoil includes first and second cavities separated by a divider, and wherein a second radial tab of the at least one radial tab is at a circumferential location of collar projection that corresponds to a location of the divider.

2. The airfoil piece of claim 1, wherein the collar projection has a first radial extent and the at least one radial tab has a second radial extent, and a ratio of the first radial extent to the second radial extent is between 1:1 and 1:5.

3. The airfoil piece of claim 1, wherein the at least one radial tab comprises a plurality of radial tabs, and the plurality of radial tabs have a cumulative circumferential extent.

4. The airfoil piece of claim 3, wherein the cumulative circumferential extent is between and 20 and 40% of a circumferential extent of the collar projection.

5. The airfoil piece of claim 1, wherein the airfoil section and collar projection include at least one continuous ceramic matrix composite ply.

6. The airfoil piece of claim 1, wherein the hollow airfoil section is configured to receive a metallic spar piece therein.

7. An airfoil assembly, comprising:
a vane piece having a first vane platform, a second vane platform, and a hollow airfoil section joining the first vane platform and the second vane platform, the hollow airfoil section including a collar projection extending past the first vane platform, the collar projection including at least one radial tab projecting therefrom;
a spar piece defining a spar platform and a spar extending from the spar platform into the hollow airfoil section, the spar piece including a radial pocket defined by first and second opposed faces, the radial pocket configured to receive the collar projection.

8. The airfoil assembly of claim 7, wherein the collar projection has a first radial extent and the at least one radial tab has a second radial extent, and a ratio of the first radial extent to the second radial extent is between 1:1 and 1:5.

9. The airfoil assembly of claim 7, wherein the at least one radial tab comprises a plurality of radial tabs, and the plurality of radial tabs have a cumulative circumferential extent.

10. The airfoil assembly of claim 9, wherein the cumulative circumferential extent is between 20 and 40% of a circumferential extent of the collar projection.

11. The airfoil assembly of claim 7, wherein the airfoil section and collar projection include at least one continuous ceramic matrix composite ply.

12. The airfoil assembly of claim 7, wherein the collar projection is a radially outer collar projection.

13. The airfoil assembly of claim 7, wherein the spar piece is metallic and the airfoil piece is ceramic matrix composite.

14. The airfoil assembly of claim 7, wherein the spar piece is configured to transfer structural loads from the airfoil piece to a support structure via the collar projection.

15. The airfoil assembly of claim 7, wherein the radial pocket includes at least one mating feature configured to mate with the at least one radial tab.

16. A method of assembling a vane, comprising:
inserting a spar piece into a cavity of a hollow airfoil section of an airfoil piece, the airfoil piece having a first vane platform, a second vane platform, the hollow airfoil section joining the first vane platform and the second vane platform, the hollow airfoil section including a collar projection extending past the first vane platform, the collar projection including at least one radial tab projecting therefrom, wherein the spar piece is metallic and the airfoil piece is ceramic matrix composite.

17. The method of claim 16, wherein the inserting includes aligning a pocket in a spar platform of the spar piece with the collar projection.

18. The method of claim 17, wherein the pocket includes at least one mating feature configured to mate with the at least one radial tab.

19. An airfoil piece, comprising:
a first vane platform;
a second vane platform; and
a hollow airfoil section joining the first vane platform and the second vane platform, the hollow airfoil section including a collar projection extending past the first vane platform, the collar projection including at least one radial tab projecting therefrom, wherein the hollow airfoil section is configured to receive a metallic spar piece therein.

* * * * *